(12) United States Patent
Boe et al.

(10) Patent No.: US 7,780,926 B2
(45) Date of Patent: Aug. 24, 2010

(54) HEAT EXCHANGE PROCESS AND REACTOR

(75) Inventors: Michael Boe, Klampenborg (DK); Søren Gyde Thomsen, Lyngby (DK)

(73) Assignee: Haldor Topsøe A/S, Lyngby (DK)

( * ) Notice: Subject to any disclaimer, the term of this patent is extended or adjusted under 35 U.S.C. 154(b) by 545 days.

(21) Appl. No.: 11/135,567

(22) Filed: May 24, 2005

(65) Prior Publication Data
US 2005/0265908 A1    Dec. 1, 2005

(30) Foreign Application Priority Data
May 29, 2004    (DK) ............................... 2004 00855

(51) Int. Cl.
*F28D 21/00*    (2006.01)
*C01B 3/24*    (2006.01)
(52) U.S. Cl. ............... 422/205; 422/198; 422/202; 422/211; 423/650; 423/651; 423/652; 423/659
(58) Field of Classification Search ................ 422/198, 422/202, 205, 211; 423/650–652, 659
See application file for complete search history.

(56) References Cited
U.S. PATENT DOCUMENTS

| 3,730,229 A | * | 5/1973 | D'Onofrio | 138/114 |
| 4,455,154 A | | 6/1984 | Blasiole | |
| 4,661,323 A | * | 4/1987 | Olesen | 422/197 |
| 4,847,051 A | * | 7/1989 | Parenti, Jr. | 422/202 |
| 6,096,106 A | * | 8/2000 | Ruhl et al. | 48/197 R |

FOREIGN PATENT DOCUMENTS

| DE | 40 10 151 | 10/1990 |
| DE | 199 26 201 | 1/2001 |
| EP | 0 334 792 | 9/1989 |
| EP | 0 382 098 | 8/1990 |
| GB | 826 681 | 1/1960 |
| GB | 1 356 151 | 6/1974 |
| JP | 2002-318015 | 10/2002 |
| WO | WO 03/089128 | 10/2003 |

* cited by examiner

*Primary Examiner*—Walter D Griffin
*Assistant Examiner*—Lessanework Seifu
(74) *Attorney, Agent, or Firm*—Dickstein Shapiro LLP

(57) ABSTRACT

Process for carrying out heat exchange reactions comprising introducing a reactant stream into a bed of catalytic material placed outside at least one double walled heat transfer tube in a heat exchange reactor contacting the reactant stream with the catalytic material in indirect heat exchange with a heat transfer medium present in the annular volume of the at least one double walled heat transfer tube, the annular volume comprising one or more spacer elements creating a helical flow path of the heat transfer medium around the inner heat transfer tube of the at least one double walled heat transfer tube. The invention also includes a heat exchange reactor for carrying out the above reaction.

10 Claims, 8 Drawing Sheets

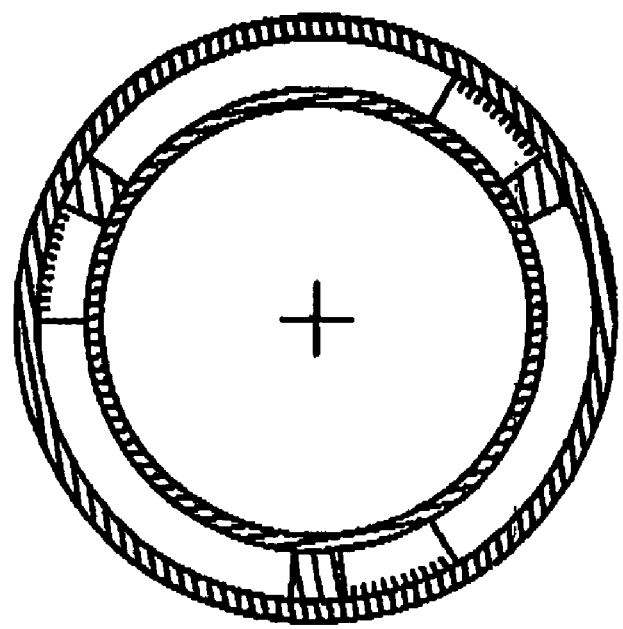
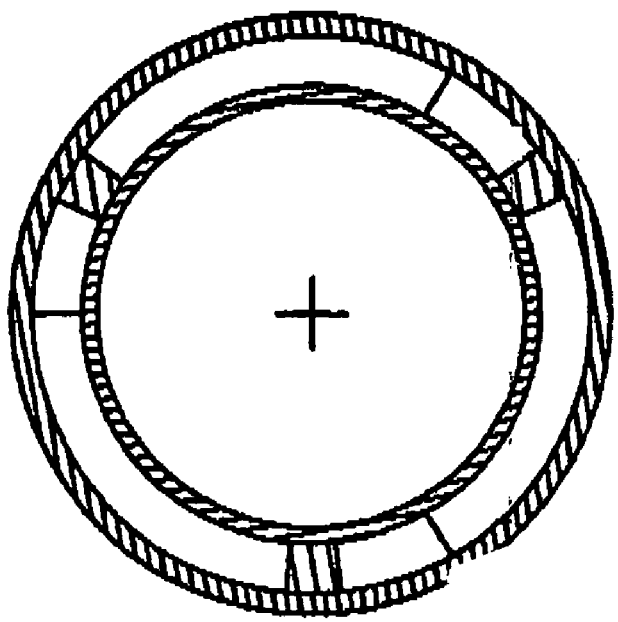
Figs. 3 (top) and 4 (bottom)

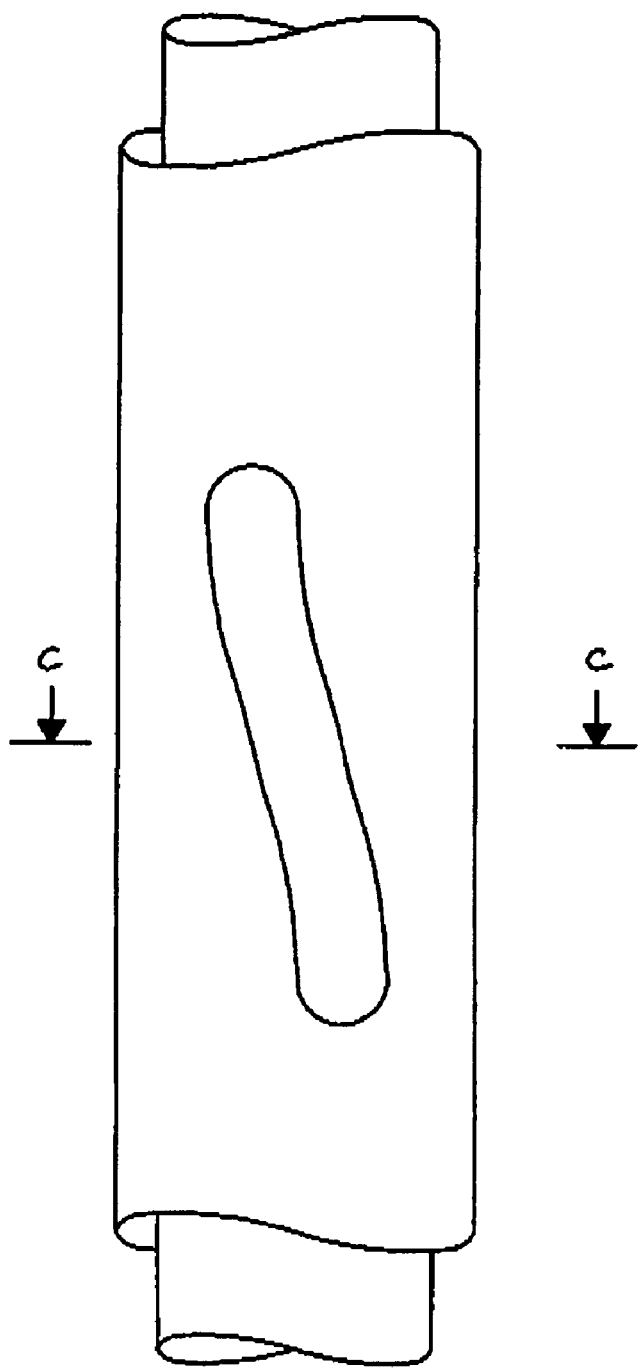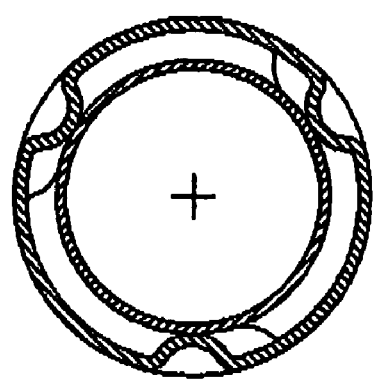
Fig. 6                                             Fig. 6a

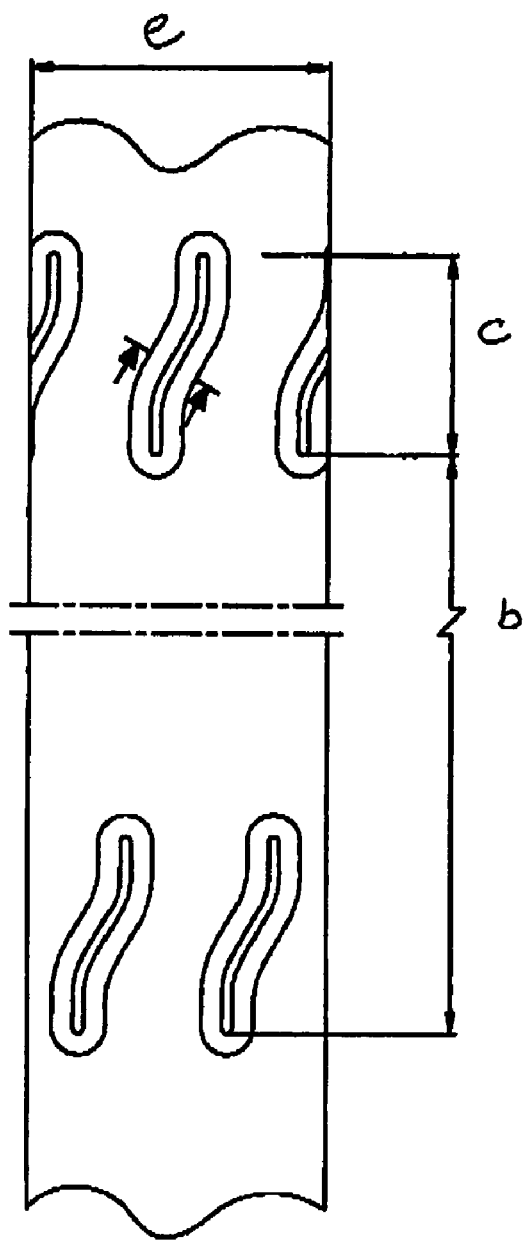
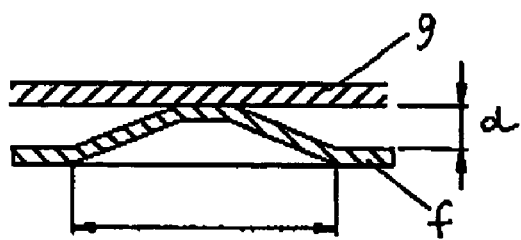
Figs. 8 (top) and 9 (bottom)

HEAT EXCHANGE PROCESS AND REACTOR

The invention relates to a heat exchange process and reactor for the conversion of a reaction stream in indirect heat exchange with a heat transfer medium. In particular, the invention concerns a heat exchange reactor with improved heat transfer across the walls of double heat transfer tubes present in the reactor.

BACKGROUND OF THE INVENTION

Heat exchange reactors of the double tube type are well known in the chemical field. They are especially useful when indirect heat exchange is required for providing or removing heat to or from a specific reaction.

A double tube device in its simplest form consists of an inner tube placed in an outer tube thus creating an annular volume in the space between the tubes. The placement of the inner tube inside the outer tube is very important for the function of the double tube. In many cases the best function is achieved by centring the inner tube inside the outer tube, but in other cases an asymmetrical placement of the inner tube is most effective. In all cases spacers are used to obtain the proper placement of the two tubes relative to each other. The function of the spacers is to fix the placement of the inner tube on the transverse cross section relative to the outer tube, while allowing for freedom of movement between the tubes in the longitudinal direction.

Double tube devices can have several uses in chemical reactors. One such use is in a double tube reactor in which a heat transfer fluid is transported in the annular volume of the double heat transfer tube, the heat transfer fluid serving to provide or obtain heat to or from a chemical reaction occurring outside the outer tube and/or inside the inner tube. Heat transport conditions to or from the heat transfer fluid transported in the annular volume are often not uniform along the perimeter of the outer heat transfer tube or even in some special cases of the inner heat transfer tube. Various heat transfer devices aimed at improving the heat transfer of the heat transfer fluid are known in the art.

The double tube reactor has one or more double heat transfer tubes. Typically catalyst is placed inside the inner tube. The double tube reactor can, however, also be used in a configuration with the double heat transfer tubes placed in a catalytic bed. Inside the inner tube could be fluid, catalyst or a void. The inner tube could also be substituted by a rod. Each double tube is therefore in this configuration surrounded by catalyst particles which can catalyse an exothermic or an endothermic reaction.

In the case where an exothermic chemical reaction occurs in the catalytic bed outside the double heat transfer tube, the heat generated results in external heating of the outer heat transfer tube.

Transfer of the generated heat to the heat transfer fluid in the annular volume can sometimes be problematic due to uneven heating of the outer heat transfer tube resulting in only some sections around the perimeter of the outer tube experiencing external heating. The heat transfer fluid flowing in the annular volume has a straight flow pattern and uneven heating of the outer heat transfer tube causes higher temperatures of the heat transfer fluid in some sections.

In the case where an endothermic chemical reaction occurs outside the double heat transfer tube, the heat required to enable the reaction to occur is provided by hot heat transfer fluid in the annular volume. When a double heat transfer tube is used together with other double heat transfer tubes higher temperatures are experienced in areas, where the distance to the nearest hot double tube is short. Where there is a longer distance between the double heat transfer tubes lower temperatures are experienced. This non-uniform gas temperature distribution causes uneven heating of the catalyst particles and this has an undesirable effect on the chemical reactions taking place in the reactor. The non-uniform temperature distribution in the catalytic bed results also in a non-uniform temperature distribution of the heat transfer fluid, when the heat transfer fluid flowing in the annular volume has a straight flow pattern.

It is an objective of this invention to provide a heat exchange process using a heat transfer medium having a helical flow path for indirect heat transfer to or from a fluid or a solid medium.

It is also an objective of the invention to provide a heat exchange reactor of the double tube type for use in the above process using a heat transfer medium for indirect heat transfer to or from a fluid or a solid medium surrounding the tubes.

BRIEF SUMMARY OF THE INVENTION

The invention comprises a heat exchange reactor of the double tube type having spacer elements in the annular volume of the double heat transfer tubes. The spacer elements are formed to cause a flowing heat transfer medium to rotate around the double tube axis, while it flows through the annular volume. The resulting flow pattern takes the form of a spiral or a helix, which leads to several advantages compared to conventional double tube reactors with no rotation i.e. compared to straight flow of the heat transfer medium in the annular volume.

The invention provides therefore a process for carrying out heat exchange reactions comprising introducing a reactant stream into a bed of catalytic material placed outside at least one double walled heat transfer tube in a heat exchange reactor contacting the reactant stream with the catalytic material in indirect heat exchange with a heat transfer medium present in the annular volume of the at least one double walled heat transfer tube, the annular volume comprising one or more spacer elements creating a helical flow path of the heat transfer medium around the inner heat transfer tube of the at least one double walled heat transfer tube.

The invention provides also a heat exchange reactor for use in the above heat exchange process comprising at least one double walled heat transfer tube positioned within a bed of catalytic material, the at least one double walled heat transfer tube consisting of an inner heat transfer tube placed within an outer heat transfer tube thereby forming an annular volume for flow of a heat transfer medium between the inner surface of the outer heat transfer tube and the outer surface of the inner heat transfer tube, the annular volume comprising one or more spacer elements along the length of the double heat transfer tube, the spacer elements having contact or near contact to both the inner and outer heat transfer tubes, the spacer elements creating a helical flow path of the heat transfer medium around the inner heat transfer tube.

When non-uniform heat transport conditions to or from the heat transfer medium transported in the annular volume of the double heat transfer tubes exist along the perimeter of the outer tube rotating the flow pattern causes any part of the fluid to experience the different conditions along the perimeter, thereby lowering or eliminating the fluid temperature differences around the perimeter at any location along the length of the double tube.

BRIEF DESCRIPTION OF THE DRAWINGS

FIG. 3 is a schematic diagram illustrating spacer elements mounted on the inner surface of the outer tube.

FIG. 4 is schematic diagrams illustrating spacer elements held by compressive forces between the walls of the annular volume.

FIGS. 6 and 6a are schematic diagrams illustrating spacer elements integrated in the outer tube.

FIG. 8 shows a planar view of an unfolded inner tube integrated with spacer elements.

FIG. 9 shows section a-a depicted in FIG. 8.

DETAILED DESCRIPTION OF THE INVENTION

The process and reactor of the invention are applicable when heat is to be transferred indirectly to or from the heat transfer medium inside the annular volume of at least one double heat transfer tube to an external bed of catalytic material. The reactor of the invention is particularly advantageous and shows improved heat transfer when several double heat transfer tubes are present in the reactor.

Additional catalytic material can be placed inside the inner tubes if required.

Figure 1:
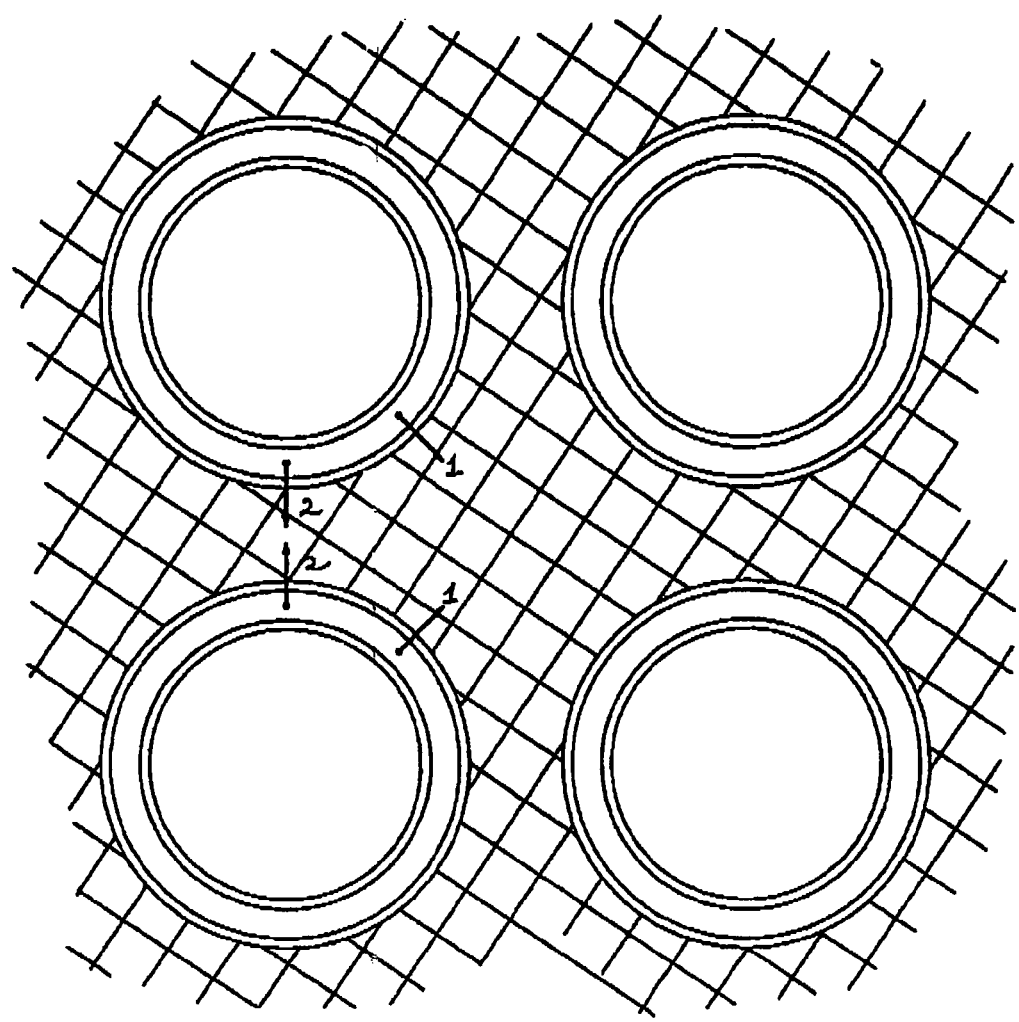
FIG. 1 is a schematic diagram showing four double heat transfer tubes positioned in catalytic material.

In order to illustrate the problem associated with heat transfer in a conventional reactor with double heat transfer tubes situated in a catalytic bed, reference is made to FIG. 1.

FIG. 1 is a schematic diagram showing four double heat transfer tubes positioned in catalytic material catalysing an endothermic chemical reaction. The heat transfer medium, typically a hot gas, therefore provides heat for the reaction taking place outside the double heat transfer tubes in the catalytic bed. The arrows 1 and 2 indicate the direction of heat transport at different positions from the heat transport medium in the annular volume of the double heat transfer tubes to the catalytic material outside the tubes. With conventional non-circulating straight flow of the heat transfer medium through the annular volume of the double heat transfer tubes more heat is transferred across the outer tube wall in the direction where larger amounts of catalytic material are placed.

The direction of high heat transport is indicated by the arrow 1. Consequently, this would lead to a lower temperature of the heat transfer medium in the annular volume at these positions, while the temperature of the heat transfer medium would be higher at vicinities of short distance to a neighbouring double heat transfer tube, as shown by the arrow 2, indicating the direction of low heat transport.

The increased drop in temperature of the heat transfer medium, as it runs through the annular volume at orientations where more heat transport is needed would in turn decrease the heat transport at these orientations. The result would be an increasing non-uniform temperature distribution in the flow of the heat transfer medium around the circumference at a given cross section and unequal catalyst temperature distribution outside the double heat transfer tubes i.e. high catalyst temperatures where the tubes are placed close to each other and low catalyst temperatures, where there is a longer distance to the nearest tube.

With respect to exothermic chemical reactions, the heat transfer arrows 1 and 2 in FIG. 1 point in a direction opposite that for endothermic reactions. In this case higher temperatures of the heat transport medium are found in direction 1 and lower temperatures in direction 2.

In both types of reactions, the uneven temperature distribution is undesirable as it leads to less effective heat transfer and utilisation of the catalyst resulting in the need for building a longer reactor with a larger heat transfer surface and more catalyst.

The invention solves the problem associated with straight flow of the heat transfer medium in the annular volume of the double heat transfer tubes. In order to avoid the additional cost of a larger reactor, spacer elements are introduced into the annular volume and their presence cause the flow of the heat transfer medium to rotate in the annular volume. This rotation causes the heat transfer medium to experience similar conditions throughout its volume, because the heat transfer medium is flowing past areas where alternately low and high heat transport takes place. The resulting increased uniformity of temperatures at a given cross section in the reactor reduce the necessary size of the reactor in addition to reducing mechanical stresses and/or elastic or plastic deformations related to differential thermal expansion.

In the heat exchange reactor of the invention different fluid or solid media can occupy the volumes outside the outer tube. If required, the channel formed within the inner surface of the inner tube can also contain fluid or solid media such as catalytic material. Alternatively, it can comprise a solid tube or an empty tube. The solid and fluid media can have different compositions, temperature, pressure and flow speeds. Furthermore, the different volumes can be partially filled with catalyst and chemical reactions can take place. The tube walls separating the media allow heat transfer to take place from one medium to another.

The annular volume contains the heat transfer fluid. However, some catalytic material can additionally be present provided there is no interference with the helical flow of the heat transfer medium. The catalytic material could for example be in the form of catalysed hardware or catalyst pellets.

The double heat transfer tube consists of an inner tube placed in an outer tube thus creating an annular volume in the space between the tubes. The inner tube consists of a wall having an inner and an outer surface. The outer surface of the inner tube wall contributes to creating the annular volume. The outer tube also consists of a wall having an inner and an outer surface. The outer surface of the wall of the outer tube is in contact with the catalytic bed, while the inner surface of the outer tube wall also contributes to creating the annular volume.

Figure 2:
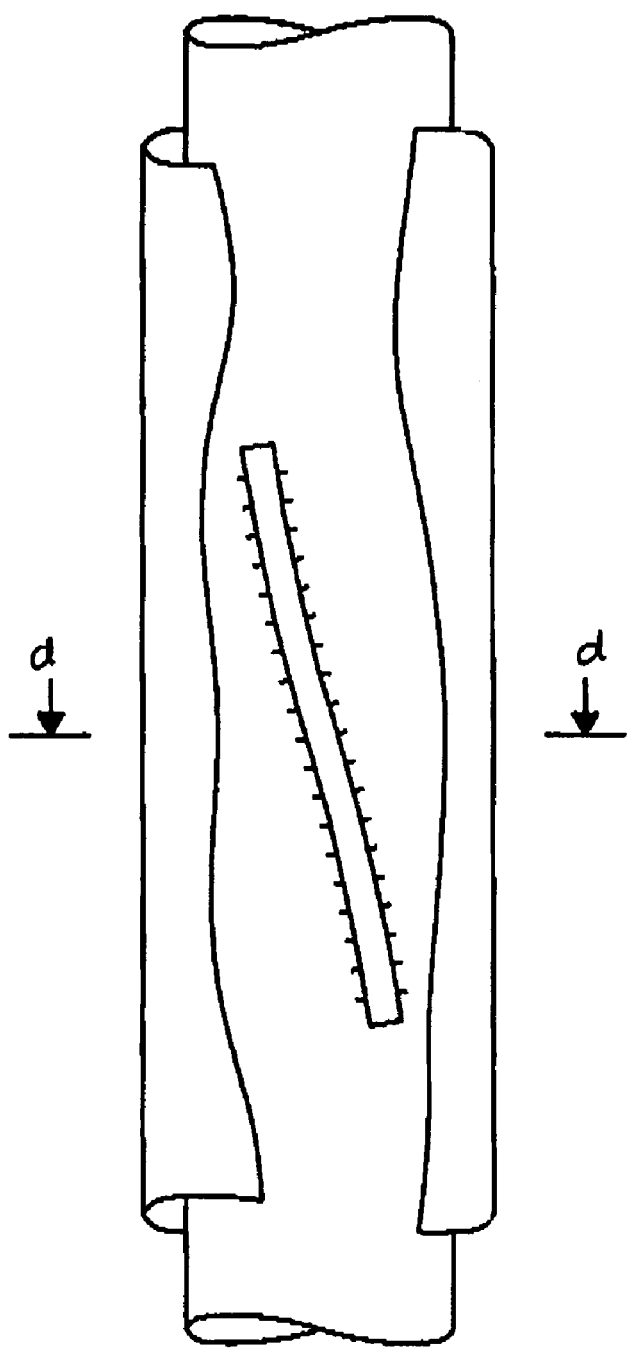
FIGS. 2 and 2a are schematic diagrams illustrating spacer elements mounted on the outer surface of the inner tube.
Figure 2A:
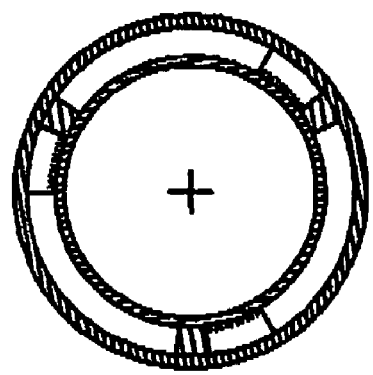

The spacer elements can be mounted on either the outer surface of the inner tube or the inner surface of the outer tube. This is illustrated in the embodiment of FIG. 2, where the spacer element is mounted on the outer surface of the inner tube. The embodiment of FIG. 2a shows the cross section noted d-d in FIG. 2. In the embodiment of FIG. 3 the spacer element is mounted on the inner surface of the outer tube.

The spacer elements in embodiments 2 and 3 are formed separately from the tubes and are attached to the tube surface by means of welding. Attachment of spacer elements can furthermore be done by means of brazing, gluing, threaded connections, pins, rivets and other methods known in the art of fastening. Their transverse cross-sectional shape can be in any form, for instance square, rectangular, circular, triangular or even variable in shape provided it allows attachment to the tube surface. The longitudinal cross-sectional shape can also have any form.

Instead of being mounted on one of the tube surfaces, the spacer elements can be kept in place by compressive or frictional forces exerted by the walls of the inner and outer tubes. This is shown in FIG. 4.

Figure 5:
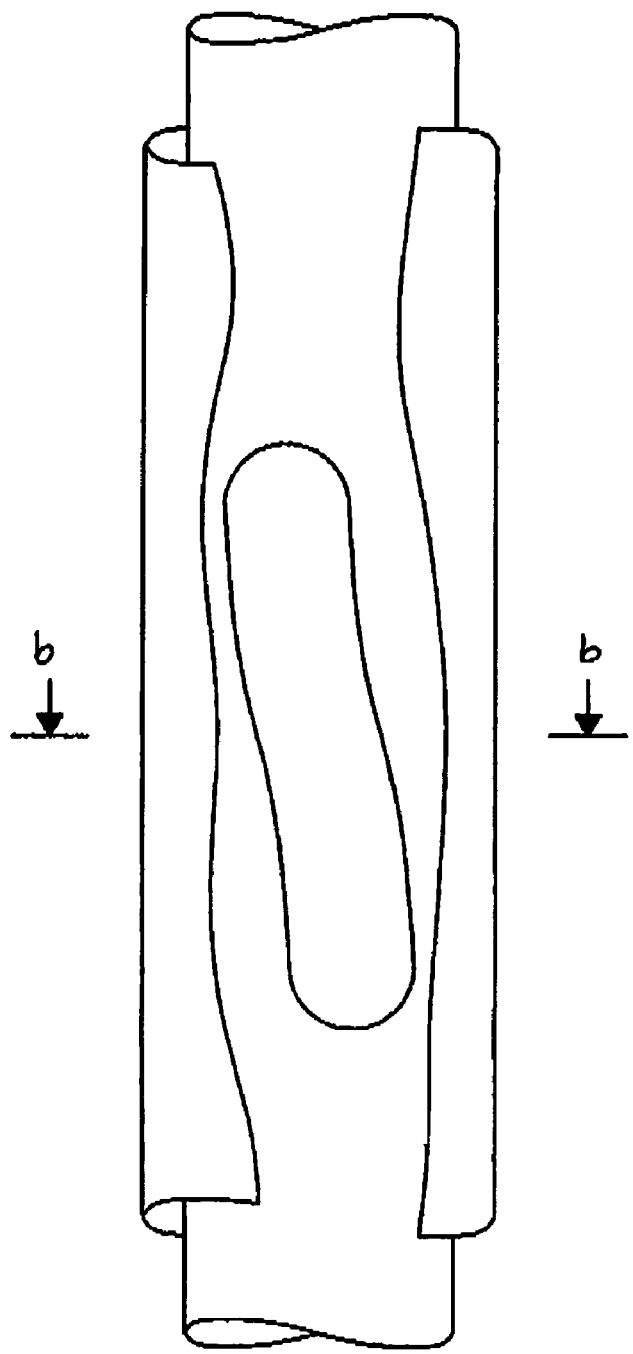
FIGS. 5 and 5a are schematic diagrams illustrating spacer elements integrated in the inner tube.
Figure 5A:
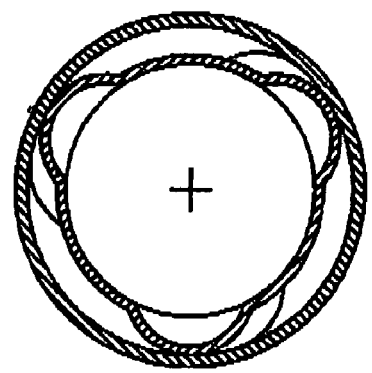

The spacer elements can also be integrated in one or both of the tube walls if one or both tubes are formed so that the inner tube fits precisely inside the outer tube. FIG. 5 shows a longitudinal section of a spacer element where the outer tube has been opened up to show the spacer element integrated in the inner tube. FIG. 5a shows a cross section through both tubes along the line b-b shown in FIG. 5.

FIGS. 6 and 6a likewise respectively show a longitudinal section of a spacer element integrated in the outer tube and a cross section through both tubes along the line c-c.

The contact between the inner and the outer tube, which creates the precise fit, can be in the form of point contacts, line contact or larger contact areas.

Figure 7:
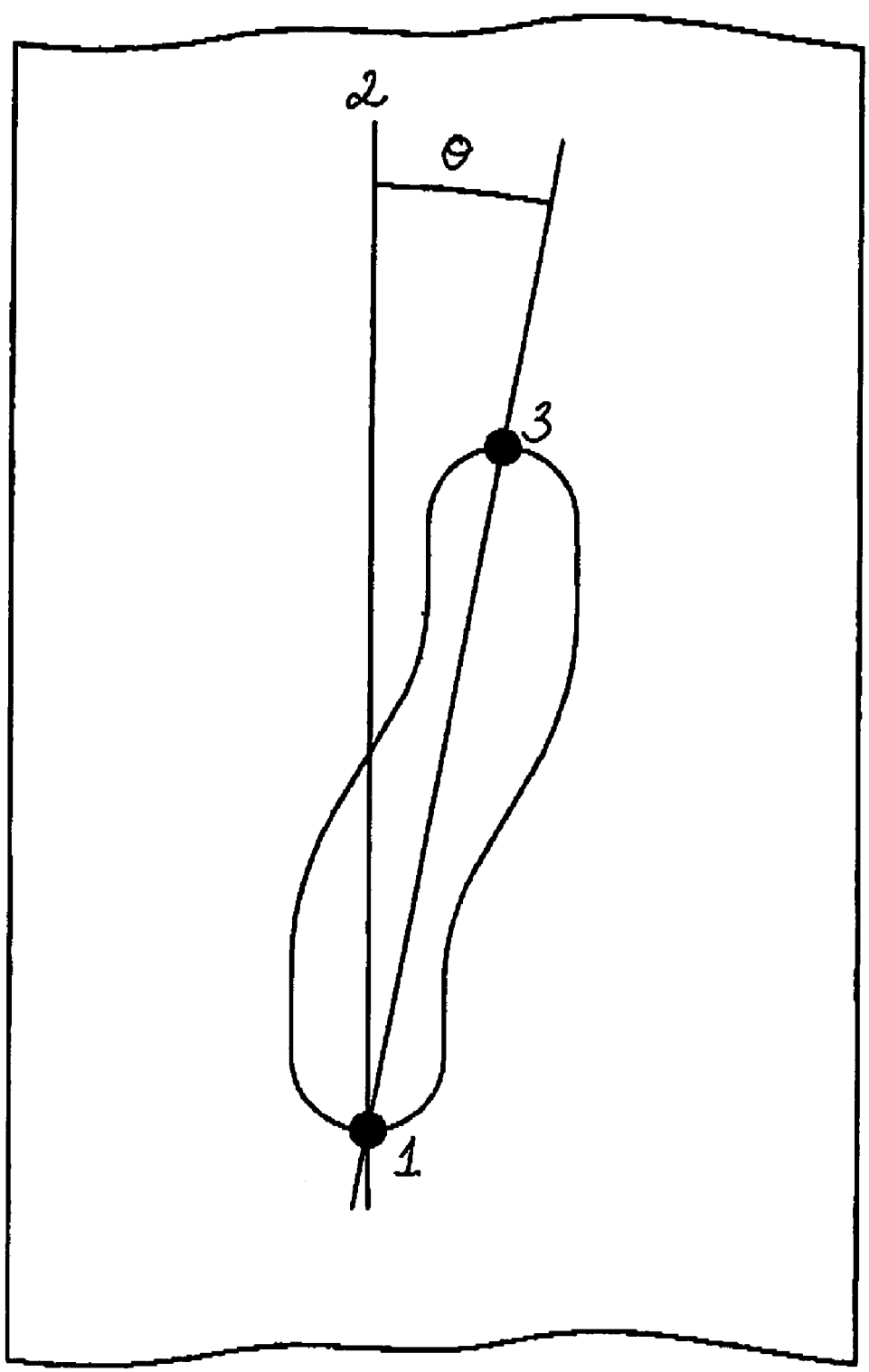
FIG. 7 is a diagram showing the rotation of the spacer element relative to the tube axis.

The spacer elements can have any shape. However, a preferred embodiment is shown in FIG. 7. The spacer element has a starting point 1 and an end-point 3 along the tube axis 2 corresponding to the first and last points, respectively, on the spacer along the tube axis. The end-point 3 is rotated relative to the tube axis for a fixed starting point. The spacer angle θ is the angle between the longitudinal direction and the spacer element. A line from spacer starting point 1 to spacer end-point 3 drawn on the cylinder surface has the angle θ relative to the longitudinal tube direction. This creates a helical flow path of the heat transfer medium. From the starting point 1 to the end-point 3 the spacer elements can, for example, be straight, curved, s-shaped or multi-curved in shape, with a variable or fixed cross-sectional shape as mentioned earlier.

A low θ causes modest annulus flow rotation and a high θ causes high annulus rotation. The angle θ is larger than 0° and smaller than 90°. The most suitable range for θ, however, is 5°-60°.

For comparison, the value of θ is 0° for conventional spacers, and consequently they do not introduce a helical flow path.

FIG. 8 shows a planar view of an unfolded inner tube integrated with spacer elements integrated in the inner tube as depicted in FIGS. 5 and 5a. The outer tube is not shown. The section a-a shows a cross-section of the spacer element. The figure shows two levels of spacer elements separated by a distance b each spacer having a length in the longitudinal direction c. Each level has two spacers that are uniformly distributed on the tube circumference. The spacer pattern rotation from one level to another indicates that the spacer elements on one level can be shifted a number of degrees relative to the spacer elements on the previous level, in this case 90°, around the circumference of the tube. The inner tube circumference e is also shown.

FIG. 9 shows section a-a of a spacer element depicted in FIG. 8. The spacer element f has a height d in the radial direction. The cross-section is shown together with the unfolded outer tube g.

Figure 10:
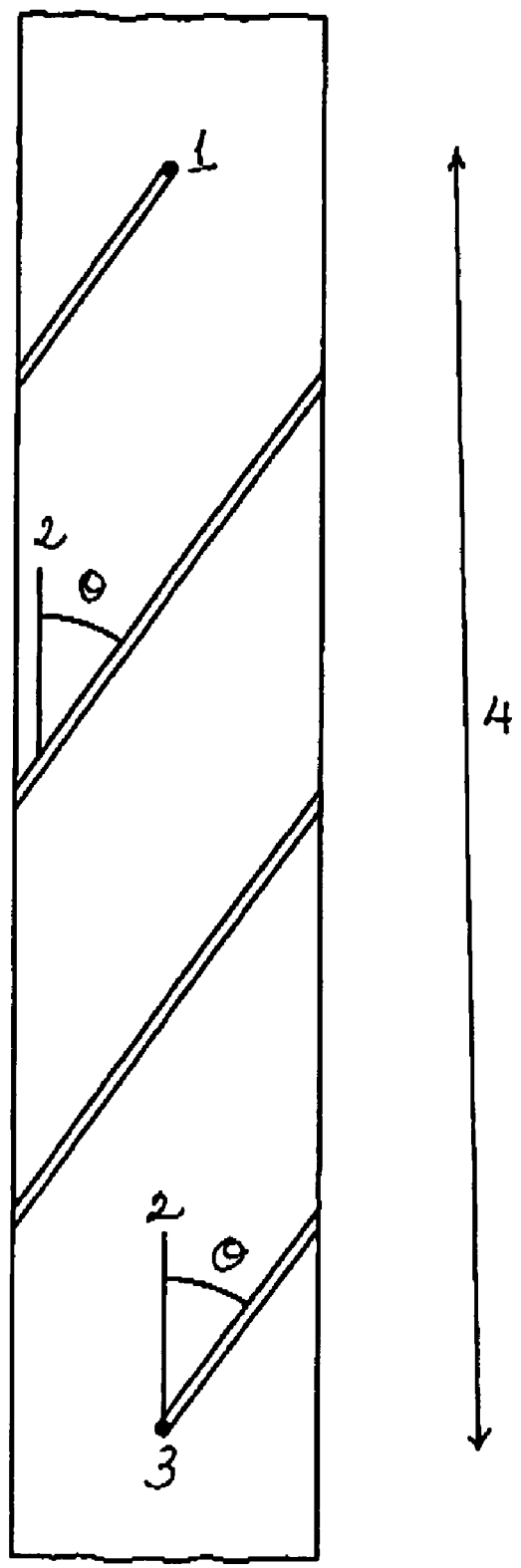
FIG. 10 shows a planar view of an unfolded inner heat transfer tube with a spacer element that continues along the length of the inner tube and makes three full rotations around the double tube.

FIG. 10 shows another preferred embodiment comprising a long spacer element shown in the unfolded inner tube. The long spacer completes three full rotations around the double tube axis. Alternatively, it can be continuous along the whole length of the inner tube. The spacer elements are similar to the embodiments shown in FIGS. 2 and 3, and they are formed separately from the tubes and are attached to the tube surface by means of for instance, welding or otherwise, as mentioned earlier. Their transverse cross-sectional shape can be in any form, for instance square, rectangular, circular or triangular provided it allows attachment to the tube surface. The longitudinal cross-sectional shape can also have any form. The spacer angle θ is measured from the longitudinal direction to the spacer element and is greater than 0° and less than 90°. The spacer length 4 is the distance from the starting point 3 to the end point 1 along the longitudinal axis 2.

In a further embodiment of the invention catalyst particles are placed in the channel formed within the inner surface of the inner tube. Catalytic material is therefore present outside the outer tube and inside the inner tube.

All the embodiments described above have the advantage of creating a helical flow path for the heat transfer medium.

Catalytic steam reforming of a hydrocarbon feedstock is a process, in which a hydrocarbon feedstock (typically methane) is reacted with steam forming a hydrogen and carbon monoxide rich synthesis gas according to the following endothermic reaction:

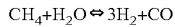

$$CH_4 + H_2O \leftrightharpoons 3H_2 + CO$$

The reforming reaction is an equilibrium reaction and the product stream contains primarily hydrogen and carbon monoxide and a minor amount of carbon dioxide, methane and steam. At equilibrium conditions, temperatures of 500-1000° C. and pressures of 0.1-4 MPa are experienced.

A suitable heat exchange reactor applicable in the above reaction is a gas heated reformer. The heat transfer medium in this case can be reformed gas and it can provide heat for the reforming reaction taking place in the catalyst bed.

EXAMPLE

A double tube gas heated reformer with double heat transfer tubes placed in the catalytic bed as shown in FIG. 1 is used. The channels in the inner tubes of the double heat transfer tubes also contain catalyst particles. Spacer elements are integrated in the inner tubes as shown in FIGS. 5, 8 and 9.

A reactant stream mixture of methane and steam at a temperature of 360° C. is introduced into the reformer, where during catalytic contact the gas reacts to a mixture of hydrogen, CO, $CO_2$, methane and steam at a temperature of 880° C., inside the inner tubes and outside the outer tubes. The considerable amount of heat needed for both the endothermic reaction and the heating of the reactant gases is derived from a heat transfer medium consisting of a hot gas flow of reformed gas at 1000° C. present in the annular volume of the reformer. This hot gas heat exchanges with the gas undergoing steam reforming in the presence of the catalyst and leaves the annular volume at 650°.

The dimensional data given below refers to FIGS. 8 and 9:

| | |
|---|---|
| Number of double heat transfer tubes: | 61 |
| Heat Transfer tube length: | 11000 mm |
| Number of spacer levels: | 14 |
| Spiral spacers at each level: | 2 |
| Spacer distribution on each level: | 180 degrees apart (uniform) |
| Spacer pattern rotation from level to next level: | 90 degrees |
| Distance between spacer | 775 mm |

-continued

| Levels (B): | |
| Spacer length (C): | 187 mm |
| Spacer height (D): | 8 mm |
| Spacer angle (θ): | 13.2 degrees |

The results showed that the number of spiral shaped rotations around the axis of the double tube performed by the annulus gas during flow through the entire double tube length was six turns. The pressure drop increase caused by the spacers was 70% which was acceptable.

What is claimed is:

1. Process for carrying out heat exchange reactions comprising:
    introducing a reactant stream into a bed of catalytic material placed outside at least one double walled heat transfer tube comprising an inner heat transfer tube placed within an outer heat transfer tube in a heat exchange reactor, the at least one double walled heat transfer tube defining an annular volume; and
    contacting the reactant stream with the catalytic material in indirect heat exchange with a heat transfer medium present in the annular volume of the at least one double walled heat transfer tube,
    wherein the annular volume comprises at least two spacer elements along a length of the double walled heat transfer tube, the spacer elements having a spacer length in a longitudinal direction of the double walled heat transfer tube, the spacer length being smaller than the length of the double walled heat transfer tube, the spacer elements creating a helical flow path of the heat transfer medium around a heat transfer tube of the at least one double walled heat transfer tube, such that the heat transfer medium flows past areas of alternately low and high heat transport and thereby experiences similar conditions throughout its volume, and wherein the spacer elements are formed integrally in the inner heat transfer tube or in the outer heat transfer tube.

2. Process according to claim 1, wherein the heat exchange reaction is a steam reforming reaction.

3. Heat exchange reactor for use in the process of claim 1 comprising at least one double walled heat transfer tube positioned within a bed of catalytic material, the at least one double walled heat transfer tube consisting of an inner heat transfer tube placed within an outer heat transfer tube thereby forming an annular volume for flow of a heat transfer medium between the inner surface of the outer heat transfer tube and the outer surface of the inner heat transfer tube, the annular volume comprising at least two spacer elements along a length of the double heat transfer tube, the spacer elements having a spacer length in a longitudinal direction of the double walled heat transfer tube, the spacer length being smaller than the length of the double walled heat transfer tube, the spacer elements creating a helical flow path of the heat transfer medium around the inner heat transfer tube, such that the heat transfer medium flows past areas of alternately low and high heat transport and thereby experiences similar conditions throughout its volume, and wherein the spacer elements are formed integrally in the inner heat transfer tube or in the outer heat transfer tube.

4. Reactor according to claim 3, wherein the at least two spacer elements have an endpoint which is rotated relative to the tube axis with a fixed starting point.

5. Reactor according to claim 4, wherein the endpoint of the at least two spacer elements is rotated at an angle greater than 0° and less than 90° relative to the tube axis.

6. Reactor according to claim 3, wherein the annular volume comprises catalytic material.

7. Reactor according to claim 3, wherein the inner heat transfer tube comprises catalytic material.

8. Reactor according to claim 3, wherein the heat exchange reactor is a steam reforming reactor.

9. Process according to claim 1, wherein the spacer elements are formed integrally in the inner heat transfer tube.

10. Reactor according to claim 3, wherein the spacer elements are formed integrally in the inner heat transfer tube.

* * * * *